United States Patent
Ono et al.

(10) Patent No.: US 6,282,211 B1
(45) Date of Patent: Aug. 28, 2001

(54) PACKET MULTIPLEXER WITH AUTOMATIC COMMUNICATION PATH OPTIMIZATION BASED ON LOOP DETECTION

(75) Inventors: Satoshi Ono; Kazuyuki Terao, both of Tokyo (JP); Shin Miyakawa, Palo Alto, CA (US)

(73) Assignees: Nippon Telegraph and Telephone Corp.; NTT Multimedia Communications Laboratories, Inc., both of Tokyo (JP)

( * ) Notice: Subject to any disclaimer, the term of this patent is extended or adjusted under 35 U.S.C. 154(b) by 0 days.

(21) Appl. No.: 09/160,516

(22) Filed: Sep. 24, 1998

(51) Int. Cl.[7] ....................................... H04J 3/12
(52) U.S. Cl. .......................... 370/524; 370/420; 370/535
(58) Field of Search ..................... 370/498, 522, 370/524, 535, 420; 379/93.01, 93.05, 93.14

(56) References Cited

U.S. PATENT DOCUMENTS 5,463,683 * 10/1995 Collins et al. ..................... 379/201
6,118,796 * 8/2000 Brennan et al. ..................... 370/524

\* cited by examiner

*Primary Examiner*—Ajit Patel
*Assistant Examiner*—Bob A. Phunkulh
(74) *Attorney, Agent, or Firm*—Olson & Hierl, Ltd.

(57) ABSTRACT

A packet multiplexer capable of realizing the optimization of a communication path automatically, without requiring a user to explicitly specify for it, is disclosed. The packet multiplexer is formed by a plurality of first communication interfaces for terminating a plurality of C-plane and U-plane pairs on one side of the packet multiplexer, a second communication interface for terminating a single C-plane and a plurality of U-planes on another side of the packet multiplexer, a connection interface for multiplexing the C-plane and U-plane pairs terminated at the first communication interfaces into the single C-plane and the plurality of U-planes terminated at the second communication interface, and a control unit for controlling multiplexing of U-planes by the connection interface according to signaling through C-planes, such that a cut-through is made within the packet multiplexer between two U-planes terminated at the first communication interfaces that form a loop.

6 Claims, 6 Drawing Sheets

PACKET MULTIPLEXER WITH AUTOMATIC COMMUNICATION PATH OPTIMIZATION BASED ON LOOP DETECTION

BACKGROUND OF THE INVENTION

1. Field of the Invention

The present invention relates to a packet multiplexer for multiplexing low speed channels into a high speed channel in a communication system.

2. Description of the Background Art

In order to utilize a transmission path economically, a multiplexer is used in assembling several low speed channels and connecting them to a high speed channel. As a method for multiplexing, a time division multiplexing and a frequency division multiplexing are available, but here a conventional time division multiplexing scheme will be described.

As a conventional time division multiplexer, a time division multiplexer (TDM), a high functional channel division multiplexer (S-TDM), etc. have been used. TDM is a multiplexer in which time-slots are fixedly allocated with respect to a plurality of low speed channels and multiplexed on a time axis, while S-TDM is a multiplexer in which an improvement of a data transmission efficiency is realized by efficiently allocating vacant time-slots when there is no information. Note that high speed signals transmitted in time-slot forms by a multiplexer at one end of a plurality of low speed channels will be converted into signals for low speed channels so as to recover original data by a multiplexer at another end (also called a demultiplexer: usually one multiplexer has both functions of the multiplexer and the demultiplexer) which carries out the similar operation in an opposite way.

Thus the conventional multiplexers have an object of simply bundling a plurality of low speed channels. Usually these low speed channels comprise a plurality of user planes (U-plane) for carrying out user data transfer between end-to-end users, and a control plane (C-plane) to be used for set up, maintenance, and release of calls, U-planes and connections between a user and a network. For example, in the Integrated Service Digital Network (ISDN), the B-channel plays a role of U-plane and the D-channel plays a role of C-plane.

Now, in the conventional multiplexer (MUX) shown in FIG. 1, suppose that telephone numbers No. 1 to No. 23 are respectively allocated by the dial-in service to 23 channels accommodated in the MUX. In FIG. 1, an encircled number represents telephone numbers (only No. 1 to No. 3 are depicted). Then in the case where a person at No. 1 makes a telephone call to a person at No. 3, the communications become possible as a U-plane (B-ch) is established through a switching system by the function of a C-plane (D-ch), similarly as in the case of making a telephone call to a person at No. 2. In this case, it is convenient in that a telephone number is fixed to each channel, but despite of the fact that channels of No. 1 and No. 3 are accommodated in the same MUX, the U-plane is to be established via a demultiplexer (DE-MUX) and a switching system which are connected beyond the MUX and then switched back to the same MUX again, so that a wasteful route occurs in the established U-plane and the effective utilization of communication facilities is not realized.

Next consider the case where a PBX (Private Branch eXchanger) is introduced instead of MUX as shown in FIG. 2. In this case, when a person at No. 1 makes a telephone call to No. 3, a communication path is short-cut by the function of PBX and established without going up to a switching system so that it is possible to realize the optimization of a communication path. On the other hand, when a person at No. 1 makes a telephone call to No. 2, it is necessary for that person to explicitly specify the use of an external line by carrying out the so called 0 dialing. Even in this case, if a person at No. 1 makes a telephone call to a person at No. 3 after carrying out the 0 dialing, the resulting communication path will be one via a switching system. Thus, conventionally, the optimization of a communication path has been realized by requiring a user to explicitly specify for it.

SUMMARY OF THE INVENTION

It is therefore an object of the present invention to provide a packet multiplexer capable of realizing the optimization of a communication path automatically, without requiring a user to explicitly specify for it.

According to one aspect of the present invention there is provided a packet multiplexer for multiplexing communication channels containing C-planes and U-planes, comprising: a plurality of first communication interfaces for terminating a plurality of C-plane and U-plane pairs on one side of the packet multiplexer; a second communication interface for terminating a single C-plane and a plurality of U-planes on another side of the packet multiplexer; a connection interface for multiplexing the C-plane and U-plane pairs terminated at the first communication interfaces into the single C-plane and the plurality of U-planes terminated at the second communication interface; and a control unit for controlling multiplexing of U-planes by the connection interface according to signaling through C-planes, such that a cut-through is made within the packet multiplexer between two U-planes terminated at the first communication interfaces that form a loop.

Other features and advantages of the present invention will become apparent from the following description taken in conjunction with the accompanying drawings.

DETAILED DESCRIPTION OF THE PREFERRED EMBODIMENTS

Referring now to FIG. 3 to FIG. 8, one embodiment of a packet multiplexer according to the present invention will be described in detail.

Figure 3:
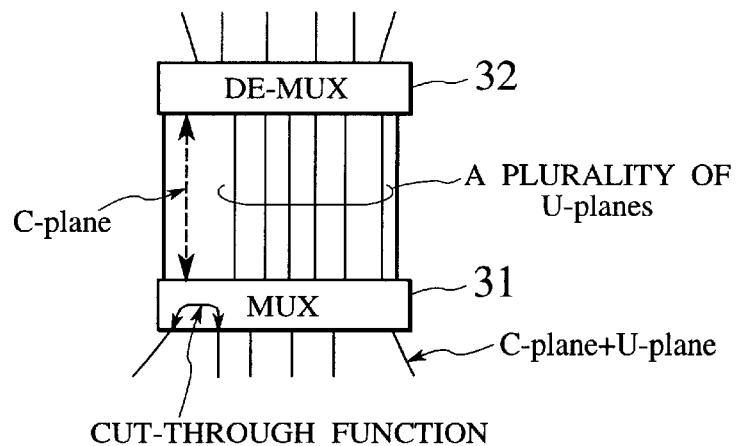
FIG. 3 is a schematic diagram showing a packet multiplexer according to one embodiment of the present invention in a state of being connected with an opposing demultiplexer.

In this embodiment, a multiplexer with a Fall-back function will be realized as shown in FIG. 3, where a multiplexer (MUX) 31 and a demultiplexer (DE-MUX) 32 are connected through a single C-plane and a plurality of U-planes, and a function for detecting a loop in the U-planes is provided in the DE-MUX 32 so that when a loop is detected, the DE-MUX 32 commands a U-plane cut-through at the opposing MUX 31 through the C-plane. In response, the opposing MUX 31 makes the optimization of a communication path by making a cut-through between two U-planes within the MUX 31 upon receiving a signaling message for this command through the C-plane.

Note that the U-plane is operated to be established by the DE-MUX according to the conventional function, but will be short-cut at the MUX in front of the DE-MUX by the short-cut command due to the loop detection such that the U-plane that has been reaching to the DE-MUX will be returned back to the MUX in front of the DE-MUX. This function is referred to here as the Fall-back function.

Figure 1:
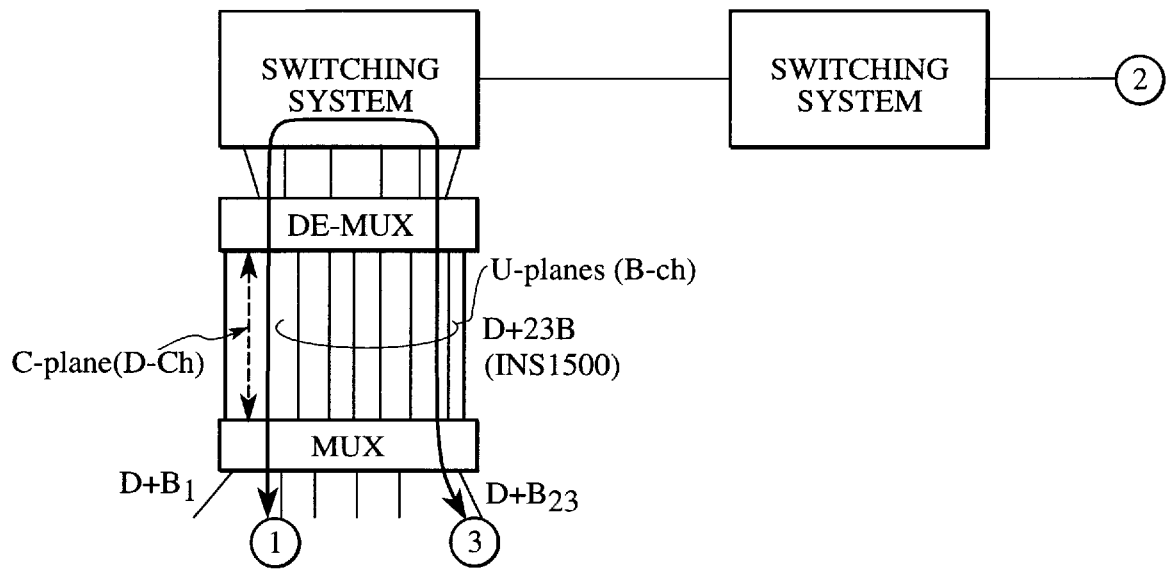
FIG. 1 is a schematic diagram showing a communication system using a conventional packet multiplexer.
Figure 2:
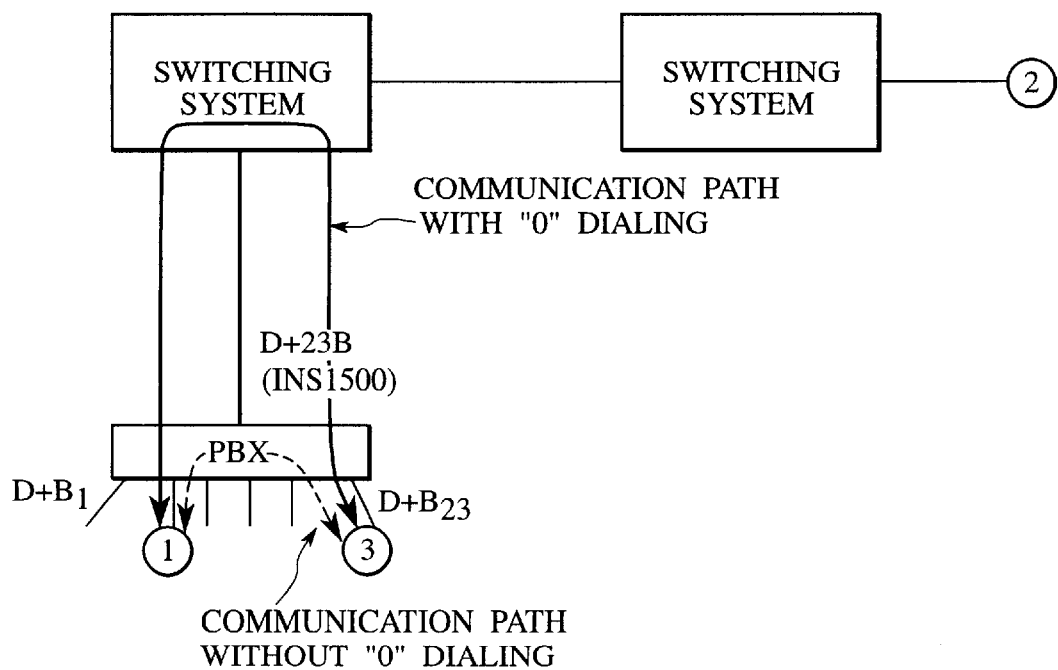
FIG. 2 is a schematic diagram showing a communication system using a conventional PBX instead of a packet multiplexer of FIG. 1.
Figure 4:
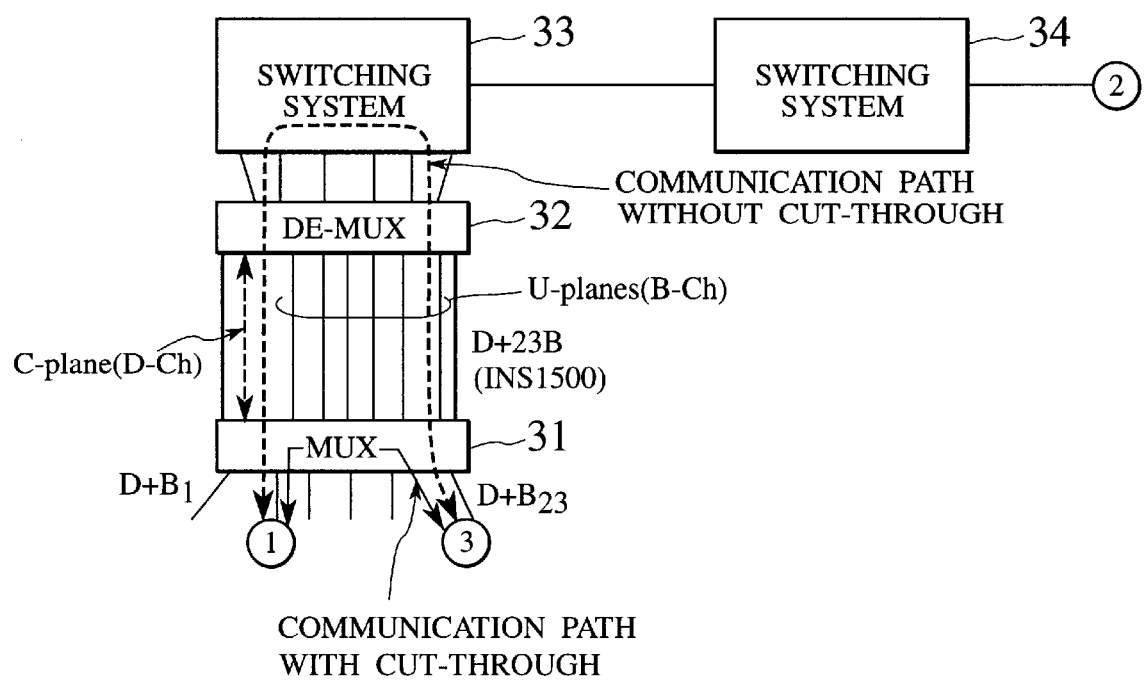
FIG. 4 is a schematic diagram showing a communication system using the packet multiplexer of FIG. 3 in a situation similar to that of FIG. 1.

When this multiplexer with a Fall-back function is applied to a case shown in FIG. 1 described above, the resulting configuration appears as shown in FIG. 4, where a switching system 33 is connected to the DE-MUX 32 and another switching system 34 is connected to the switching system 33. In FIG. 4, a dashed line indicates a communication path before making the cut-through and a solid line indicates a communication path after making the cut-through, for an exemplary case of making a telephone call from No. 1 to No. 3.

Note here that it is also possible to carry out both the U-plane loop detection and the cut-through making within a single MUX, instead of using a configuration of FIG. 3.

Figure 5:
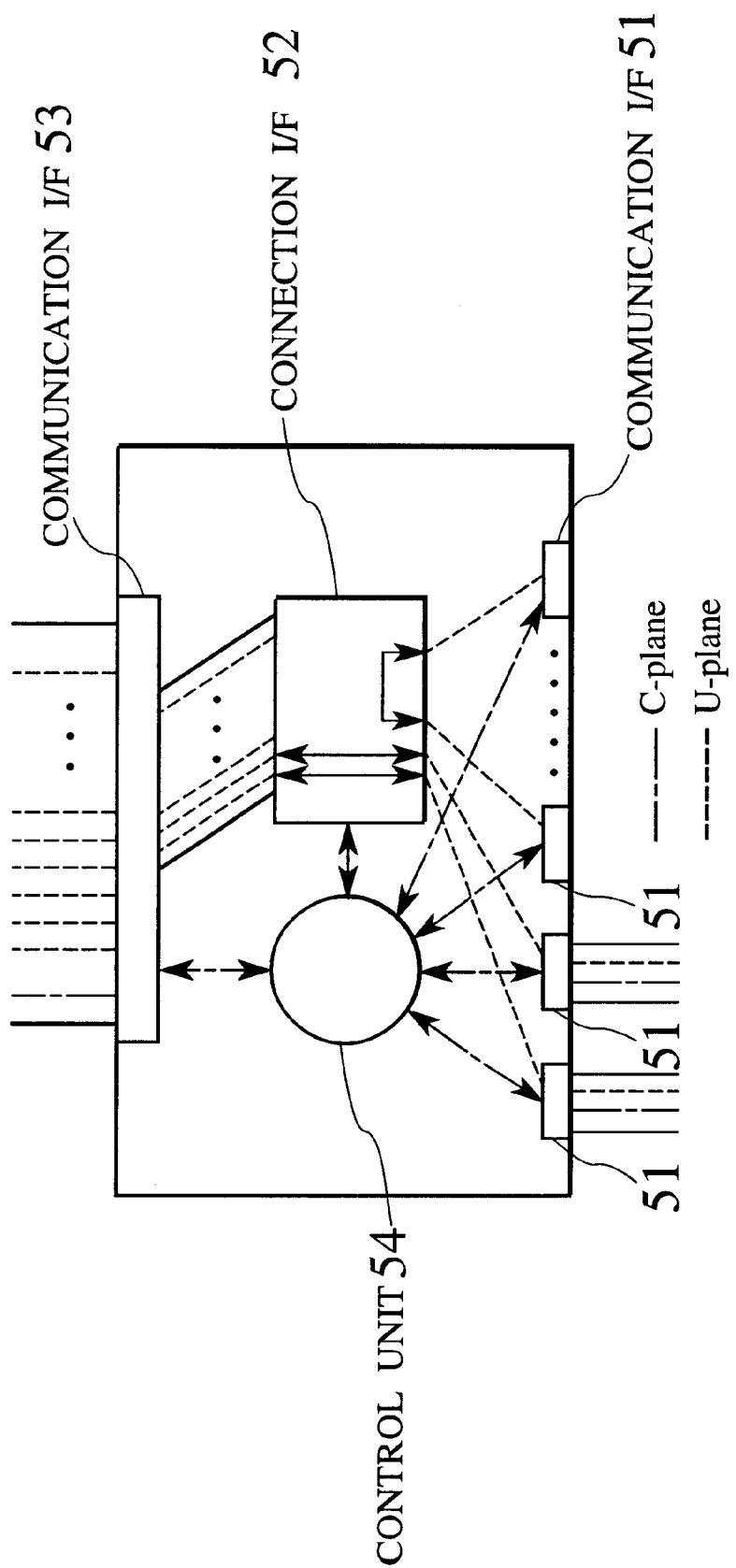
FIG. 5 is a block diagram showing a configuration of a packet multiplexer according to one embodiment of the present invention.

In this embodiment, the MUX has a configuration as shown in FIG. 5, which comprises a plurality of communication interfaces 51 each terminating a C-plane and U-plane pair, a connection interface 52 for multiplexing a plurality of U-planes terminated at the communication interfaces 51, a communication interface 53 for terminating one C-plane and a plurality of U-planes multiplexed by the connection interface 52, and a control unit 54 for controlling these interfaces 51, 52 and 53.

This MUX of FIG. 5 is to be used in pair. One C-plane and a plurality of U-planes can be established and multiplexed between two opposing MUXs. One of them will be referred to as MUX and an opposing one will be referred to as DE-MUX.

At the control unit 54, a signaling from the C-plane of each channel is transmitted or received, and the U-plane is controlled according to this signaling. Also, the U-plane loop is monitored, and in the case of detecting the loop, the cut-through in the U-planes can be commanded to the opposing MUX by using the C-plane. By the control of the control unit 54, the operation regarding each U-plane such as connection, disconnection, cut-through, etc. are realized at the connection interface 52. When the command for the cut-through is received, the control unit 54 instructs the cut-through in the corresponding U-planes to the connection interface 52, and in response the cut-through is made by the connection interface 52.

In this MUX of FIG. 5, the following functions are provided.

Multiplexing Function

This is a function which can bundle the C-plane and U-plane pairs of a plurality of end-users into one C-plane and a plurality of U-planes. Conversely, this function can also disjoint the bundle of one C-plane and a plurality of U-planes into the C-plane and U-plane pairs of respective end-users.

C-plane Transmitting and Receiving Function

This is a function which can transmit and receive the C-plane at each communication interface. Using a signaling message of the C-plane received at one communication interface, this function can transmit a signaling message to the C-plane of another communication interface.

U-plane Establishing, Transmitting and Receiving Function

This is a function which can establish the U-plane in response to a signaling of the C-plane, and in cooperation with the multiplexing function, this function can forward data of the U-plane correctly to the corresponding U-plane.

U-plane Loop Detection Function

This is a function which can detect that a connected U-plane is looping back within the own device. For example, in the case of using telephone channels at a switching system, this function can be realize by providing a table that indicates telephone numbers of channels accommodated in each MUX, and detecting the formation of a loop from the fact that the telephone numbers of channels to be established are accommodated in the same MUX.

Also, in the case of using PPP (Point-to-Point Protocol), it is possible to detect a PPP channel loop by using an information regarding PPP packet multiplexing that indicates a virtual channel belonging to a physical channel with respect to an opposing MUX that is corresponding to each PPP channel.

Also, using a table that manages a communication interface to which the user data packet is to be transmitted, it is possible to detect a loop of the corresponding U-plane in the same MUX. In the case of operating MUX singly and using telephone channels, it is possible to detect a loop by checking whether or not a channel of the correspondent is accommodated in the same MUX. In the case of packet communication, it is possible to detect a loop of the U-plane in the MUX by checking whether or not a communication interface to be utilized in transmitting packets to the correspondent is included among a plurality of communication interfaces terminating the C-plane and U-plane pairs that are provided in the MUX.

Cut-through Commanding and Executing Function

This is a function which can transmit to the C-plane a signaling message that commands the cut-through of the corresponding U-planes to the corresponding C-plane that is controlling a plurality of U-planes. Also, upon receiving this signaling message, this function can directly connect the corresponding U-planes together.

Note that the U-plane loop detection function may be provided at the DE-MUX, or may be provided at a device that is actually connecting the U-planes together, such as a switching system for example. In the former case, the DE-MUX realizes the loop detection by monitoring a connection portion of the switching system. In the latter case, the loop detection will be notified from the switching system through the DE-MUX.

It is also possible to carry out the loop detection and the cut-through making within a single MUX. In the case of operating MUX singly, when the loop is detected at the MUX, the cut-through is commanded to the control unit 54 of the own device and made by the control of the control unit 54.

Figure 6:
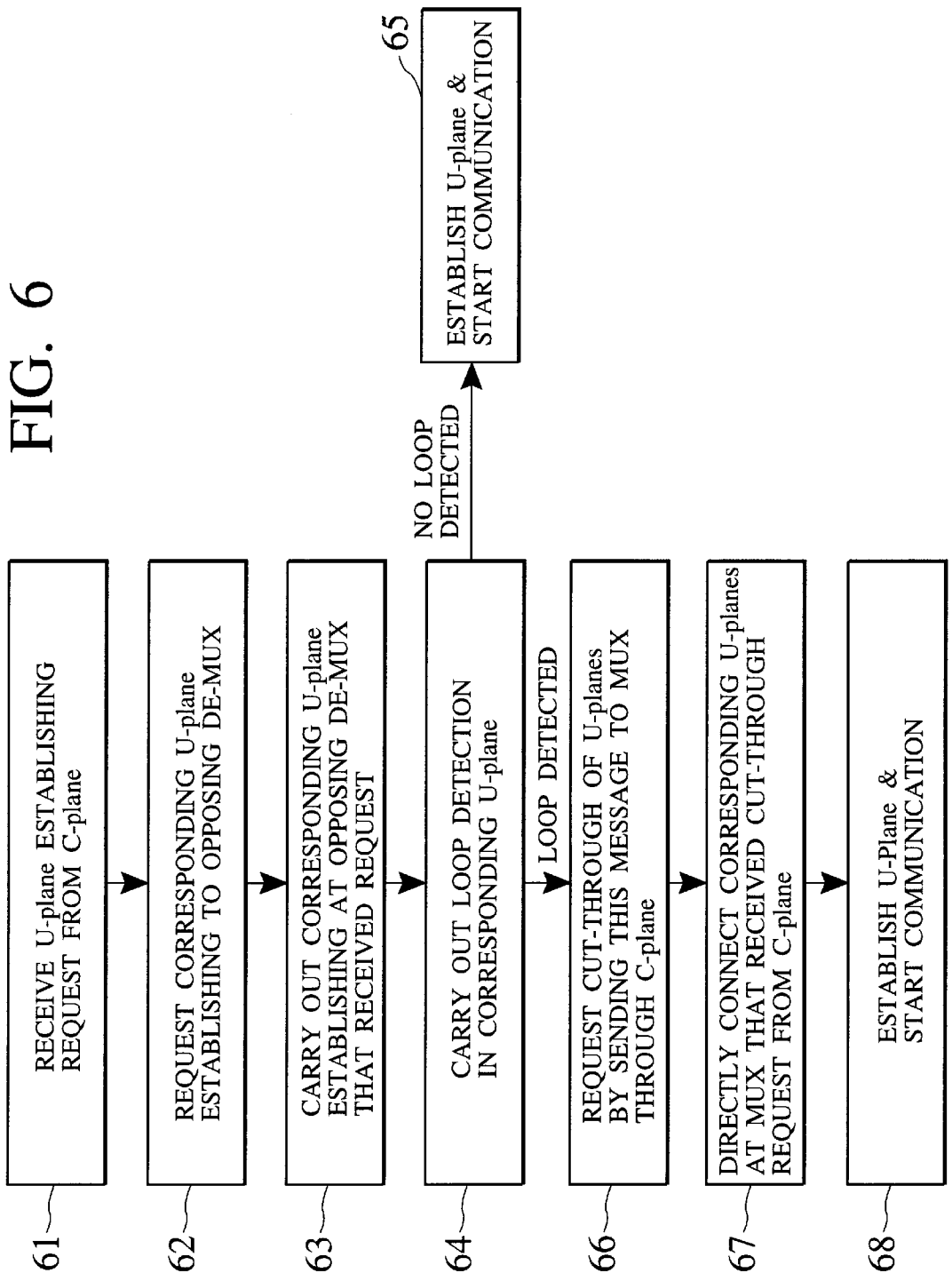
FIG. 6 is a flow chart for the operation to optimize the communication path in the communication system shown in FIG. 4.

The optimization of the U-plane to be established can be made by a procedure shown in FIG. 6 as follows.

First, when the U-plane establishing request is received from the C-plane (step 61), the establishing of the corresponding U-plane is requested to the opposing DE-MUX (step 62). Then, upon receiving this request, the opposing DE-MUX carries out the establishing of the corresponding U-plane (step 63), and carries out the loop detection in the corresponding U-plane (step 64). If no loop is detected, the U-plane is established and the communication is started (step 65). Whereas if the loop is detected, the cut-through of the U-planes is requested by sending this message to the MUX through the C-plane (step 66). Upon receiving this cut-through request from the C-plane, the MUX directly connects the corresponding U-planes (step 67). Then, the U-plane is established and the communication is started (step 68).

By this function, the communication channel can be utilized effectively and a bandwidth of the communication channel can be used without waste, so that it is particularly effective in the case of realizing the packet multiplexing.

Now, the operation of the MUX of this embodiment in the exemplary case of FIG. 1 described above will be described. In this case, the loop detection function is provided at a switching system that is actually carrying out the communication path establishing, and the detection of loop is notified from the switching system to the DE-MUX. In this case, the operation proceeds as follows.

1. A request for establishing a communication path from a No. 1 channel to a No. 3 channel is received from the C-plane of the No. 1 channel by the MUX.

2. The MUX requests the establishing of a communication path to the No. 3 channel using the D-channel of the INS1500 with respect to the DE-MUX.

3. The establishing of a communication path to the No. 3 channel is requested from the DE-MUX to the switching system by using the C-plane.

4. The switching system that received the request attempts to establish the corresponding communication path. At this point, it detects that the No. 3 channel is looping to the DE-MUX that made the request for establishing the communication path. This loop detection is judged from a switch or the like of the switching system that sets up a communication path.

5. The DE-MUX that received a notice of the loop detection from the switching system commands a cut-through of the corresponding No. 1 and No. 3 channels to the opposing MUX by using the C-plane.

6. The MUX that received the command directly connects the corresponding No. 1 and No. 3 channels in the MUX, and establishes the communication path. After the establishing, the communication is started.

By the above operation, in the case of making a telephone call from No. 1 to No. 3, the optimized communication path is established by the MUX of this embodiment without requiring the user to explicitly specify for it, unlike the conventional PBX in which the making of cut-through is judged according to whether the 0 dialing is made by the user or not.

Next, an exemplary case of applying the MUX of this embodiment to the L2 (Layer-2) integrated access scheme will be described. Note that the L2 integrated access scheme is more fully described in the commonly assigned co-pending U.S. patent application Ser. No. 09/070,123 of the applicant, which is hereby incorporated by reference.

Figure 7:
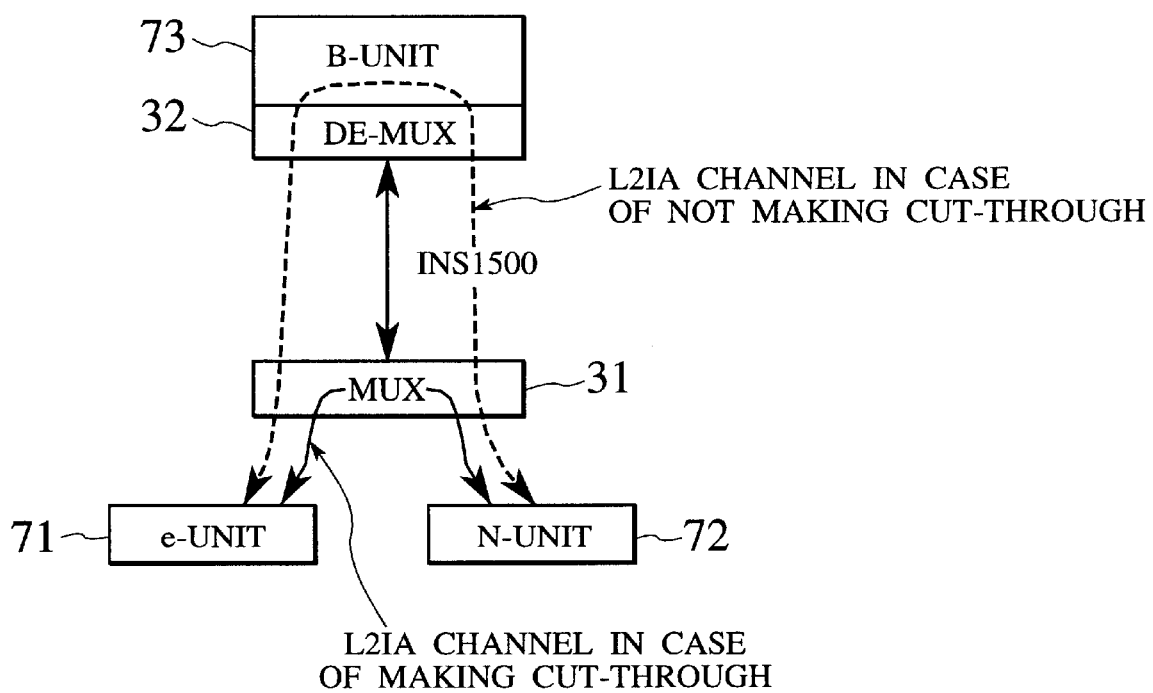
FIG. 7 is a schematic diagram showing one exemplary configuration of an L2 integrated access system using a packet multiplexer according to one embodiment of the present invention.

In the L2 integrated access system, a communication is carried out by establishing an L2IA (L2 Integrated Access) channel between an e-unit that corresponds to a host utilized by the user and an N-unit. In this case, the L2 integrated access system has a configuration as shown in FIG. 7, where the DE-MUX 32 is incorporated in a B-unit 73, and the e-unit 71 makes a connection to the B-unit 73 through the MUX 31 in an attempt to make a connection to the N-unit 72 that is connected to the same MUX 31. In this case, the operation proceeds as follows.

1. The B-unit 73 that received a request for connection from the e-unit 71 to the N-unit 72 is notified that the connection target N-unit 72 is connected to this B-unit 73 by the function of the L2 integrated access scheme, and detects that a communication path from the e-unit 71 to the N-unit 72 loops at this B-unit 73.

2. The DE-MUX 32 that received this detection requests the opposing MUX 31 to carry out a cut-through of the L2IA channel between the corresponding e-unit 71 and N-unit 72.

3. The MUX 31 then carries out the establishing of the L2IA channel that passes inside the MUX between the corresponding e-unit 71 and N-unit 72.

In this way, the L2IA channel between the e-unit 71 and the N-unit 72 that would have been established via the B-unit 73 will actually be established via the MUX 31, so that the optimization of the L2IA channel is realized.

As described above, it becomes possible to optimize the communication path without requiring the user to explicitly specify for it, so that it becomes possible to make the communication efficient and utilize communication resources effectively.

Now, in the L2 integrated access scheme, it is also possible to utilize the MUX of the present invention in multiplexing PPP channels and already multiplexed PPP multiplexed channels together into a single physical channel. In this case, the L2 integrated access scheme has a configuration as shown in FIG. 8.

Figure 8:
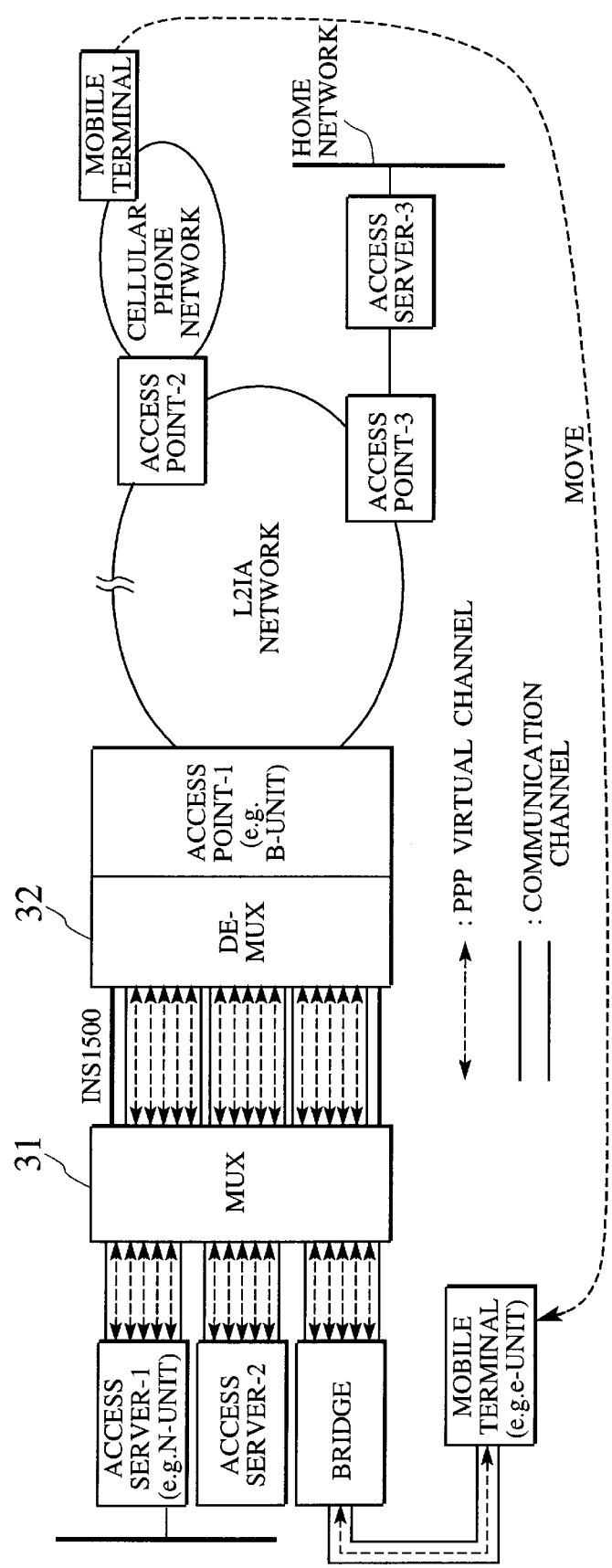
FIG. 8 is a schematic diagram showing another exemplary configuration of an L2 integrated access system using a packet multiplexer according to one embodiment of the present invention.

In FIG. 8, the user terminates a call at an access point-2 using a cellular phone network. In the case where the user who terminated a call wishes to make a connection to an access server-2, a communication path for transmitting the user data is established between the mobile terminal of the user and the access server-2 by the function of the L2IA network. Here, the connection to the access server-2 is made via the access point-1.

The user data are first relayed from the access point-2 to the access point-1. Then, the data are given from the access point-i to the DE-MUX 32. Then, an identifier indicating that it is a PPP multiplexed channel between the access server-2 and the access point-i is given to the data at the DE-MUX 32, and data are transmitted to the opposing MUX 31.

The MUX 31 that received data from the opposing DE-MUX 32 recognizes a PPP multiplexed channel to which this data belongs, according to the identifier given by the opposing DE-MUX 32, and transmits the data to a server at which the recognized PPP multiplexed channel is terminated. In this case, the data is transmitted to the access server-2.

The MUX 31 identifies the PPP multiplexed channel to which the received data belongs and appropriately distributes the data so that, by connecting access servers to the MUX 31 in parallel as shown in FIG. 8, it is possible to realize a large amount of PPP interfaces even in the case where there is a limit to the number of PPP interfaces that can be realized by an access server. Consequently, it is possible to utilize channels between the opposing MUX 31 and DE-MUX 32 effectively so that it is effective for a system that uses the packet multiplexing such as the L2 integrated access system.

In the above, the case where the mobile terminal makes a connection to the access point-2 by using a cellular phone has been described. Now, a case where the mobile terminal moves and makes a connection to an access network provided by the MUX 31 will be considered. In this case, in order to utilize the service of the L2 integrated access scheme, the mobile terminal makes a connection to the access point-1 via the MUX 31 by utilizing the access network first. Here the access network provided by the MUX 31 is a network which connected with the MUX 31 when the mobile terminal makes a connection to the access point-1.

When a terminal capable of terminating the PPP multiplexed channel such as the e-unit of the L2 integrated access scheme is connected to this access network provided by the MUX 31, it is possible for this mobile terminal to ascertain the access network dependent identifier of the MUX 31 that is necessary in making a connection to the MUX 31, according to the well-known address or the mechanism such as ARP (Address Resolution Protocol) or DHCP (Dynamic Host Configuration Protocol). When the identifier of the MUX is ascertained, it becomes possible to exchange data between the mobile terminal and the MUX 31 by encapsulating packet data of the PPP multiplexed channel using the protocol of that access network. Moreover, the MUX 31 transmits the data from this mobile terminal to the opposing DE-MUX 32 that is incorporated in the access point-1 while guaranteeing the consistency that indicates as if the mobile terminal is directly connected to the access point, so that the mobile terminal can makes a connection to the access point-1 of the L2 integrated access network and utilize the service provided by the L2 integrated access network by treating the access network utilized in making a connection to the MUX 31 as a kind of access media.

Here, when the mobile terminal requests a connection to the access server-2, a communication path to the access server-2 will be established via the access point-1 by the function of the L2 integrated access scheme. At this point, the DE-MUX 32 that is incorporated in the access point-1 detects that the communication path to be established is looping at this access point-1, and requests the cut-through to the opposing MUX 31 by using the C-plane that is controlling the communication path establishing. Upon receiving this request, the cut-through of the corresponding communication path is made at the opposing MUX 31, so that it appears as if the connection to the access server-2 is made via the access point-1 from a viewpoint of the mobile terminal but it is actually a connection to the access server-2 that is folded in the MUX 31, and therefore it becomes possible to utilize the channels between the MUX 31 and the DE-MUX 32 effectively without requiring the user to explicitly specify for it.

As described, according to the present invention, in the case of establishing a communication path that causes a loop, the multiplexer automatically detects the loop and makes the cut-through so as to omit wasteful communication resources and utilize communication resources such as physical channels effectively, without requiring the user to explicitly specify for it.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A packet multiplexer for multiplexing communication channels containing C-planes and U-planes, comprising:

a plurality of first communication interfaces for terminating a plurality of C-plane and U-plane pairs on one side of the packet multiplexer, each first communication interface terminating a pair of C-plane and a U-plane;

a second communication interface for terminating a single C-plane and a plurality of U-planes on another side of the packet multiplexer;

a connection interface for multiplexing the plurality of C-plane and U-plane pairs terminated at the plurality of first communication interfaces into the single C-plane and the plurality of U-planes terminated at the second communication interface; and a control unit for controlling multiplexing the U-planes by the connection interface according to signaling through C-planes, such that a cut-through is made within the packet multiplexer between two U-planes terminated at the first communication interfaces that form a loop.

2. The packet multiplexer of claim 1, wherein the control unit also has a loop detection function for detecting a loop formation by the two U-planes at a time of establishing a communication path using the two U-planes.

3. The packet multiplexer of claim 2, wherein the control unit controls the connection interface to make the cut-through between the two U-planes, upon detecting the loop formation by the loop detection function at the time of establishing the communication path requested from first communication interfaces side.

4. The packet multiplexer of claim 2, wherein the control unit notifies the detection of the loop formation by the two U-planes to an opposing multiplexer device connected with the packet multiplexer through the second communication interface, upon detecting the loop formation by the loop detection function at the time of establishing the communication path requested from second communication interface side.

5. The packet multiplexer of claim 1, wherein the control unit controls the connection interface to make the cut-through between the two U-planes upon receiving a notice indicating a detection of a loop formation by the two U-planes from an opposing multiplexer device connected with the packet multiplexer through the second communication interface, at a time of establishing a communication path using the two U-planes requested from first communication interface side.

6. The packet multiplexer of claim 1, wherein the first communication interfaces terminates already multiplexed PPP (Point-to-Point) channels.

* * * * *